United States Patent
Hughes (10) Patent No.: US 11,436,797 B2
(45) Date of Patent: Sep. 6, 2022

(54) IMAGE GENERATION SYSTEM AND METHOD

(71) Applicant: Sony Interactive Entertainment Inc., Tokyo (JP)

(72) Inventor: Colin Jonathan Hughes, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/193,039

(22) Filed: Mar. 5, 2021

(65) Prior Publication Data

US 2021/0295598 A1  Sep. 23, 2021

(30) Foreign Application Priority Data

Mar. 18, 2020  (GB) ..................... 2003907

(51) Int. Cl.
  *G06T 17/10* (2006.01)
  *G06T 15/08* (2011.01)
  *G06T 15/20* (2011.01)

(52) U.S. Cl.
  CPC .............. *G06T 17/10* (2013.01); *G06T 15/08* (2013.01); *G06T 15/20* (2013.01)

(58) Field of Classification Search
  None
  See application file for complete search history.

(56) References Cited

U.S. PATENT DOCUMENTS

| 8,823,736 | B2 | 9/2014 | Barringer |
| 2003/0043147 | A1 | 3/2003 | Heim |
| 2008/0231627 | A1 | 9/2008 | Shearer |
| 2012/0293515 | A1 | 11/2012 | Clarberg |
| 2014/0347452 | A1* | 11/2014 | Smolic ................. H04N 13/111 348/54 |
| 2018/0300915 | A1* | 10/2018 | Heggelund ........... G06T 15/005 |

(Continued)

FOREIGN PATENT DOCUMENTS

WO    2008067483 A1    6/2008

OTHER PUBLICATIONS

Combined Search and Examination Report for corresponding GB Application No. 2003907.9, 7 pages, dated Aug. 19, 2020.

(Continued)

*Primary Examiner* — Nurun Flora
(74) *Attorney, Agent, or Firm* — Matthew B. Dernier, Esq.

(57) ABSTRACT

A system for rasterizing an image of a virtual environment, the system comprising a bounding volume hierarchy, BVH, obtaining unit operable to obtain a BVH representing one or more objects in the virtual environment, wherein each node of the BVH is associated with geometry information for the one or more objects at least partially contained within a bounding volume represented by that node, a frustum identification unit operable to identify a viewing frustum associated with a virtual camera defining a viewpoint within the virtual environment, a BVH identification unit operable to identify a BVH node associated with at least one bounding volume that is intersected by the frustum and a rasterization unit operable to rasterize an image of the virtual environment using the geometry information associated with the identified BVH node.

11 Claims, 6 Drawing Sheets

(56) References Cited

U.S. PATENT DOCUMENTS

2018/0350044 A1   12/2018  Ponto
2019/0318530 A1*  10/2019  Hunt ........................ G06T 15/06

OTHER PUBLICATIONS

Extended European Search Report for corresponding EP Application No. 21158635.9, 12 pages, dated Aug. 30, 2021.
Szymon, et al., "QSplat: A Multiresolution Point Rendering System for Large Meshes", Computer Graphics., Siggraph 200 Conference Proceedings, pp. 343-352, dated Jul. 23-28, 2000.
Haines Eric, et al., "RealTime Rendering" CRC Press LLC, pp. 1-112, Jan. 1, 2002.
Michael Wand et al., "The randomized z-buffer algorithm" Computer Graphics Siggaraph 2001 Conference Proceedings, pp. 361-370, Aug. 12-17, 2001.

* cited by examiner

IMAGE GENERATION SYSTEM AND METHOD

BACKGROUND OF THE INVENTION

Field of the Invention

This disclosure relates to an image generation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Raytracing is a rendering technique that has received widespread interest in recent years for its ability to generate a high degree of visual realism. Ray tracing is often utilised in simulations of a number of optical effects within an image, such as reflections, shadows, and chromatic aberrations.

This can be useful for any computer-based image generation process—for example, for special effects in movies and in generating images for computer games. While such techniques have been discussed and used for a relatively long time, it is only more recently that processing hardware has become suitably powerful so as to be able to implement raytracing techniques with an acceptably low latency for real-time applications or at least more extensive use within a piece of content.

Such techniques effectively aim to determine the visual properties of objects within a scene by tracing, from the camera, a ray for each pixel in the scene. Of course, this is a rather computationally intensive process—a large number of pixels are expected to be used for displaying a scene, and this may lead to a large number of calculations even for simpler scenes (such as those with few reflections and the like). In view of this, scanline rendering and other rendering methods have generally been preferred for rendering where the latency is considered to be important despite the lower image quality.

One technique that seeks to improve the rendering times associated with raytracing based methods is the use of bounding volumes to represent groups of objects. The use of bounding volumes is advantageous in that a group of objects may be tested for intersections by rays together, rather than on a per-object basis. This can mean that the number of intersection tests is reduced, as well as the calculations for each being simplified by the use of a simplified shape (such as a box or sphere) that is representative of the objects.

Rasterization is another rendering technique that is commonly used to render images of virtual scenes. Generally, rasterization involves a conversion between the geometry of a virtual scene and the geometry of the display; in many cases, this may include converting a 3D representation of an object into the two-dimensional plane of a display image. Rasterization tends to involve simpler operations than raytracing, although it is usually considered that the results of this process are not as high quality as those of raytracing. Of course, given the requirement for low-latency content in many cases, rasterization still has a prominent role to play in the generation of images for display.

In some cases, it is considered that it may be advantageous to make use of both processes, either for different parts of an image or for different image contexts; for example, rasterization may be more appropriate for live gameplay, while raytracing may be more suitable for less interactive cut scenes (as a higher latency may be considered less impactful, for instance). However, this can lead to a substantial processing burden in implementing both processes, as well as requiring a significant amount of data to be stored.

It is in the context of the above considerations that the present invention arises.

SUMMARY OF THE INVENTION

This disclosure is defined by claim 1.

Further respective aspects and features of the disclosure are defined in the appended claims. It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Referring now to the drawings, wherein like reference numerals designate identical or corresponding parts throughout the several views, embodiments of the present invention will be disclosed.

Figure 1:
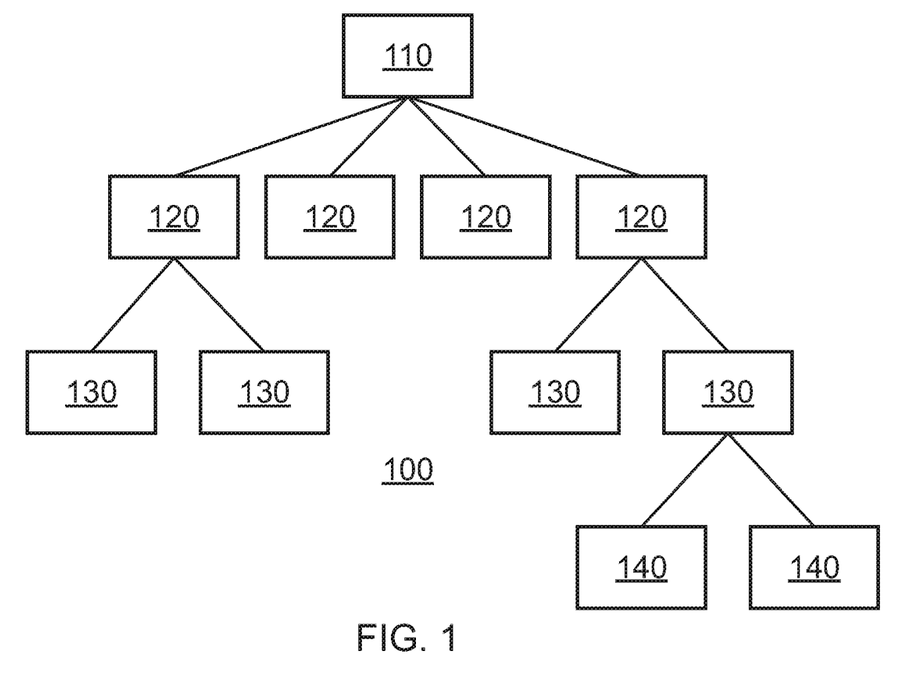
FIG. 1 schematically illustrates a bounding volume hierarchy.

FIG. 1 schematically illustrates a simple example of a bounding volume hierarchy (BVH); in this example, each box (bounding volume) represents one or more objects at a given level of detail. Each of the boxes is included in the box above it in the hierarchy—for example, the box 110 comprises information about all of objects in the environment, while each of the boxes 120 comprise a subset of the objects. These subsets may be determined in any suitable manner, although it is often considered that methods by which objects that are close to each other within an environment are grouped together and represented by the same bounding volume are preferable. In the lowest bounding volumes in the hierarchy, triangle data (or other suitable image data) is stored representing an object or a portion of an object (for example).

The level of detail for each level can be determined in any suitable fashion, and the BVH may have a maximum level of detail that is defined. For example, the BVH may terminate with bounding volumes representing groups of objects—this would lead to a coarse representation, but one that is reduced in size and may be traversed very quickly. Alternatively, the BVH may terminate with bounding volumes representing portions of objects—while this offers a finer approximation of the objects, of course this provides a BVH that is larger and may take longer to traverse. The BVH may be defined so as to comprise elements of both—such that some objects have a finer/coarser representation than others.

BVHs can be generated in a number of ways, each with its own benefits and drawbacks. For example, a top-down approach can be taken in which the bounding volumes are defined beginning with the largest sets possible. That is, the input (such as the set of objects within an environment, or a representation of those objects) is divided into two or more subsets that are each then subdivided—that is, bounding volumes are generated beginning with box 110, and proceeding to boxes 120 and so on. While this represents a fast implementation, it often results in a BVH that is rather inefficient, which can result in a larger size overall or a reduced ease of navigation.

An alternative method is that of the bottom-up approach. In this approach, the bounding volumes are defined beginning with the smallest volumes in the BVH. In the example of FIG. 1, this would mean that bounding volumes 140 are defined first, before progressing upwards to bounding volumes 130. While this can generally produce better (that is, more efficient) BVHs than the top-down approach, it can be more challenging to implement in an effective manner.

Each of these methods require information about all of the objects to be available before the BVH can be generated; this is of course acceptable in many applications, but in others it may be preferred that a BVH is able to be generated on-the-fly.

A third approach that may be considered is that of insertion methods. These may be performed on-the-fly, and they are performed by inserting objects into the bounding volumes of a BVH on a per-object basis. This means that only information about that object is necessary at the time of insertion. Insertion approaches cover a wide range of related methods in which the placement of the object is determined in a manner that identifies an optimal or suitable placement. For example, a function may be defined that evaluates the impact (in terms of size or navigability or the like) of an insertion upon the BVH, with the insertion being performed in a manner that minimises or otherwise reduces the impact upon the BVH.

Of course, any other suitable approaches may be considered compatible with the teachings of the present disclosure, rather than being limited to those discussed above.

Any suitable input data may be represented using a BVH and associated bounding volumes. For example, video games may provide a suitable source of input data for generating such a structure—in this case, the input information may be data about the virtual objects that defines their respective dimensions and locations. Similarly, information describing a real environment could be used as an information source—for example, information may be generated from images of a real environment and the objects within the environment, and this information can be used to generate a BVH that may be used to render images of that environment.

Figure 2:
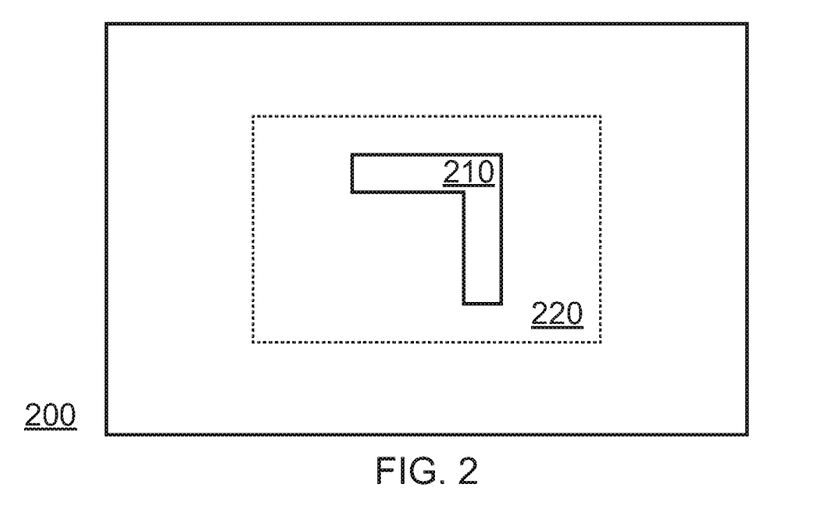
FIG. 2 schematically illustrates a bounding volume.
Figure 3:
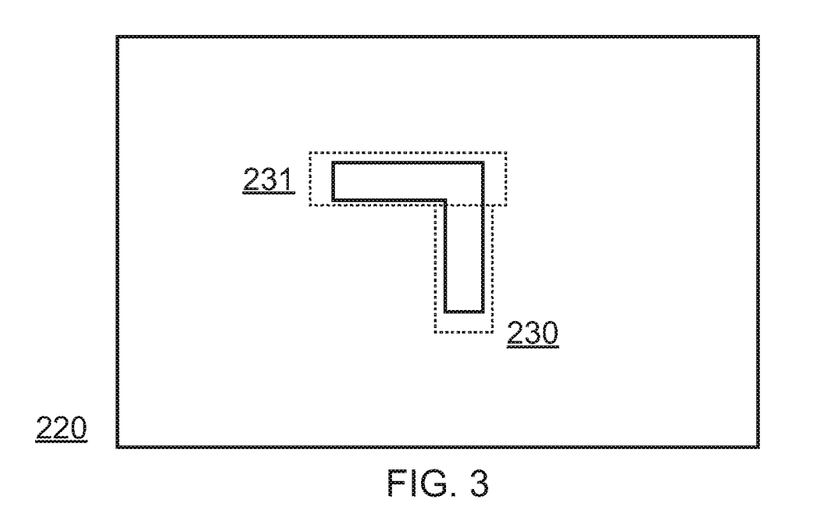
FIG. 3 schematically illustrates a plurality of bounding volumes.

FIGS. 2 and 3 schematically illustrate the use of bounding volumes in raytracing algorithms.

FIG. 2 schematically illustrates a viewport 200 in which rays are to be traced—this can be a camera view within a virtual environment to be presented to a viewer, for example. The scene comprises an object 210, which is enclosed by a bounding volume 220. Rather than testing intersections for each ray with each of the polygons that make up the object 210, which could be a rather large number, intersections are only tested with respect to the bounding volume 220. Of course, any rays that do not intersect the bounding volume 220 will not intersect the polygons that form the object 210—although of course rays may intersect the bounding volume 220 that will not intersect the polygons forming the object 210.

For example, if one hundred rays were to be tested for intersections, only one hundred tests would be required at this stage as there is a single object (the bounding volume 220) to test for each ray—rather than one hundred multiplied by the number of polygons making up the object 210.

FIG. 3 shows an enlarged version of the bounding volume 220, with smaller bounding volumes 230 and 231 used to represent the object 210. Intersections of the bounding volumes 230 and 231 can be tested for each of the rays that were found to intersect the bounding volume 220, to obtain a finer approximation of the visual appearance of the object 210.

If, for example, it were found that only ten rays intersected the bounding volume 220, this stage would require thirty tests (that is, a test for each ray with each bounding volume). This is again a very small amount relative to the testing of one hundred multiplied by the number of polygons making up the object 210 as noted above. It is therefore apparent that the falling number of rays to be considered for intersection is sufficient to offset the increasing number of bounding volumes to be considered, such that overall the total number of intersections to be tested is lower than the amount required if no bounding volumes are defined and no BVH is utilised.

In a practical implementation these volumes may be divided further until the surfaces of the object 210 are represented with a suitable level of precision for the application—such as when the bounding volumes and the polygons (primitives) representing the object occupy a similar display area, at which point the polygons may be used instead.

In these examples, the bounding volume 220 may be considered to be a higher level in the BVH than the bounding volumes 230, 231—for instance, the bounding volume 220 may correspond to a volume such as 120 of FIG. 1, while the smaller bounding volumes 230, 231 may correspond to volumes such as 130 of FIG. 1.

It is apparent from these Figures that the number of calculations that are to be performed in a raytracing method may be reduced significantly with the use of bounding volumes and BVHs; this is because the number of intersections that are to be evaluated may be reduced significantly. In many use cases, a BVH may therefore be considered a particularly efficient data structure.

As discussed above, rasterization is the process by which the geometry of a scene to be rendered is converted into pixel values so as to enable the generation of images for display. For example, the geometry of the scene may be described using 'primitives', which may be defined as polygons (such as triangles). However these are not suitably defined so as to be able to generate a direct image output, for example due to the fact that the primitives are arranged in three dimensions (and therefore a conversion is required to generate a two-dimensional representation).

In particular, rasterization comprises the generation of pixel information from those primitives, and this process can be performed with a preferred level of detail (as defined by the sample rate). The sample rate is a variable that determines the coarseness of the rasterization process, such that a lower sample rate results in the rasterization being performed on a per-pixel-group basis rather than a per-pixel basis (for example). Of course, any suitable sample rates may be selected.

Generally, rasterization involves two steps: (i) projecting a three-dimensional representation of an object into a two-dimensional image plane, and (ii) determining whether any of the two-dimensional projection lies within the pixels of the image plane. For each pixel determined as lying within a portion of the two-dimensional projection, the corresponding colour of that portion is used to determine the colour of the corresponding pixel.

The projection is performed so as to generate a shared coordinate system for pixels and triangles in the image; this is effectively a conversion of the location of triangles (or the vertices defining the triangles) from camera space to raster space. Once the conversion has been performed, the positions can then be compared and a determination can be made as to whether the triangles are present within the image and which pixels share a location with each triangle. At this point, the depth of respective triangles in the image may be considered—this enables occlusion issues to be resolved, for example. The depth may be considered in camera space without conversion in some processes, as the conversion should not affect the order in which triangles appear in the image.

Such methods usually make use of information about the triangles and their vertices on a sub-pixel level—that is, the location of triangle vertices may not be aligned with a pixel distribution and as such triangles may not be able to be described using pixel locations as vertices without resulting in inaccuracies. This may lead to the use of a significant amount of processing, as visibility of each triangle is considered for each pixel in the image; to address this, bounding boxes may be determined for each triangle so as to reduce the number of pixels for which the process is performed. However, this may still result in a significant number of wasted iterations of the process, as a number of the pixels will still not be within the triangle.

Figure 4:
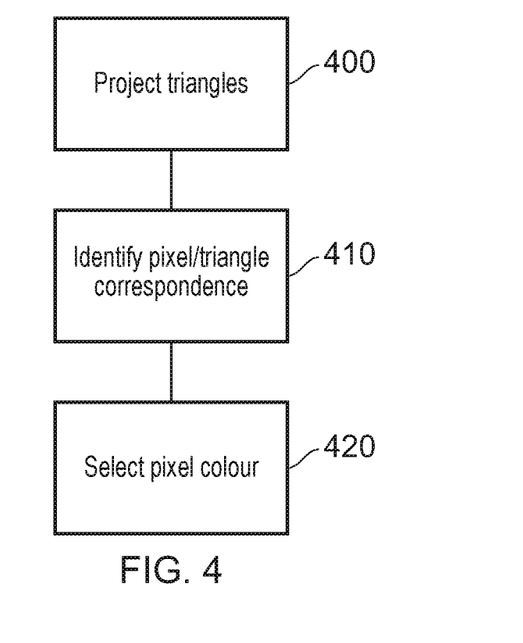
FIG. 4 schematically illustrates a simplified rasterization method.

FIG. 4 schematically illustrates a simplified example of a rasterization process in accordance with the above process. This is discussed with reference to FIG. 5; in this Figure, a triangle 500 has been projected into the raster space represented by the grid 510. The intersections of the lines within the grid 510 represent the pixels of the image that is to be generated.

Figure 5:
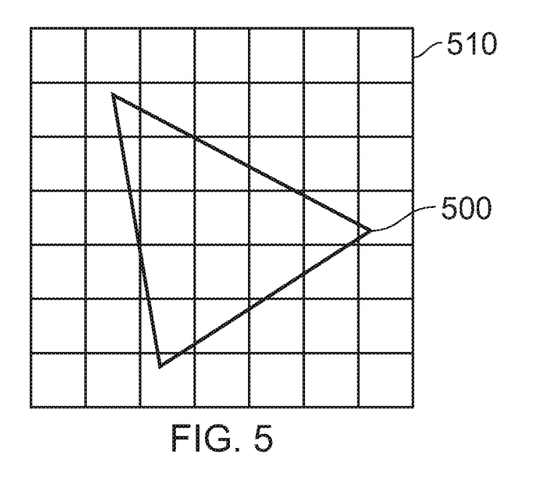
FIG. 5 schematically illustrates a projected triangle.

A step 400 comprises a projection of the triangles in camera space to the raster space plane; this may effectively be considered as a coordinate conversion, in some cases. The result of this may be represented in a form such as that shown in FIG. 4; that is, the triangle 500 is now shown on a mesh 510 representing the raster space.

A step 410 comprises identifying whether each of the pixels corresponds to a triangle in the raster space; that is, identifying whether each of the pixels shares a position in the raster space with a triangle. With particular reference to FIG. 5, this step would comprise the process of identifying whether each of the respective nodes within the mesh 510 has a position within the boundary of the triangle 500.

A step 420 comprises selecting the colour for a pixel in dependence upon an identified correspondence in step 410. In general, this step comprises associating the colour of a triangle with the pixel (or pixels) that correspond to one or more given locations. In the context of FIG. 5, each of the nodes of the mesh 510 that lie within the triangle 500 will be assigned a colour associated with the triangle 500, while the nodes of the mesh 510 that lie outside of the triangle 500 will not be associated with a colour (or will be associated with colours of triangles that are not shown in the Figure, as in practice a large number of triangles is used to provide a complete coverage of the viewpoint).

Of course, in complex scenes it becomes necessary to identify which triangles should be represented in the display image and which should not; in particular, depth within the three-dimensional scene should be considered. Any suitable process may be used to account for the overlapping of polygons in such a manner, with examples including the use of the painter's algorithm or the use of information stored in a depth buffer with a depth test.

Embodiments of the present invention are considered to provide improvements to the above process, by providing a modification to the rasterization process. The modified rasterization process may be considered to be analogous to a raytracing algorithm in that intersections of a BVH are determined and the BVH is traversed in response to the identified intersections. However, differences between these processes will be made clear in the discussion below so as to enable an improved rasterization process to be implemented.

Figure 6:
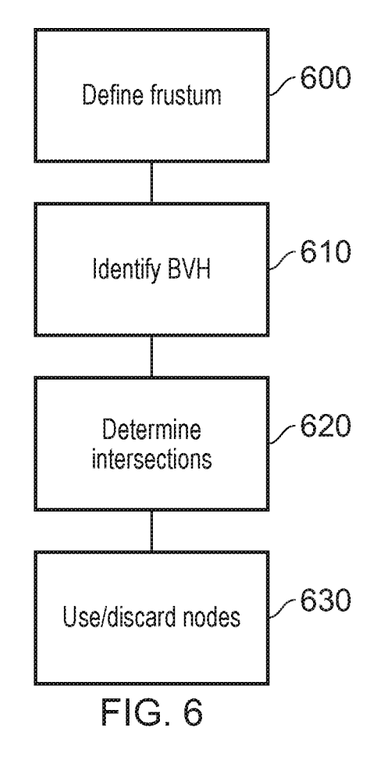
FIG. 6 schematically illustrates a modified rasterization method.

FIG. 6 schematically illustrates an example of a method according to one or more embodiments of the present disclosure.

At a step 600, a frustum is defined that represents a viewpoint within a virtual scene or environment. It is generally considered that a subset of the objects within a virtual scene or environment is included in the frustum, with one or more objects being present outside of the frustum. Of course, the method may still be applicable even if the entire scene/environment is within the frustum.

In some embodiments, the frustum may be defined as the view of a virtual camera within a virtual environment. Camera information may be used to define the virtual camera and its view, and may include the extrinsics (e.g. pose) and intrinsics (e.g. focal length) of the virtual camera. The pose of the virtual camera may be determined in dependence on a user input received at an input device. For example, the pose of the virtual camera may correspond to a player's view of a virtual environment rendered as part of a video game, with the view being controllable in dependence on inputs generated by the player.

At a step 610, one or more BVHs representing the virtual scene or virtual environment are identified. The BVH(s) may then be obtained for use, for example from a local storage device or from a server that supplies content to the rendering device.

At a step 620, a determination is made of any intersections between the frustum defined in step 600 and the BVH identified in step 610. This may comprise a comparison of the spatial positions of one or more BVH nodes and the frustum so as to determine which BVH nodes fall within the frustum and which do not. In some embodiments, the intersection determination process begins with one or more top-level BVH nodes (such as the node 110 of FIG. 1); alternatively, the intersection determination process may begin with lower level nodes (such as the nodes 120 or 130) in one or more BVHs.

In some embodiments, the nodes that are used for the intersection determination process may be selected in dependence upon contextual information relating to one or more objects represented by a BVH. Alternatively, or in addition, other metadata (such as an associated priority value for the BVH) or size information for the BVH may be considered in determining which level of the BVH to use for the initial intersection determination process.

At a step 630, BVH nodes which are not intersected by the frustum are discarded by the process as they are not required for the generation of an image (as they represent objects that are outside of the viewpoint being rendered). Those BVH nodes which are within the frustum may either be used for rendering directly, or the sub-nodes associated with those nodes may also be subjected to the intersection determination process.

That is to say that the steps 620 and 630 may be performed recursively until a given BVH detail level is reached (so as to provide a threshold level of detail) or until leaf nodes of the BVHs have been reached. In some cases, a single intersection determination process is performed (for example, when the initial BVH nodes are sufficiently small, or the level of detail required for rendering is low), while in other examples the intersection determination process may be performed a larger number of times.

For example, such a process could be embodied in representative code as follows:

```
Rasterise(BVHNode)
{
    If FrustumIntersect (BVHNode)
    {
        If(Leaf)
            {Draw Leaf Triangles}
        Else
            {For Each Child Rasterise(BVHNode.child[i])}
    }
}
```

The above process therefore illustrates that if the frustum intersects a BVH node, then an additional intersection process is performed on the child nodes (sub-nodes) associated with that node. Of course, this representative code could be implemented using any suitable programming structure or language.

Figure 7:
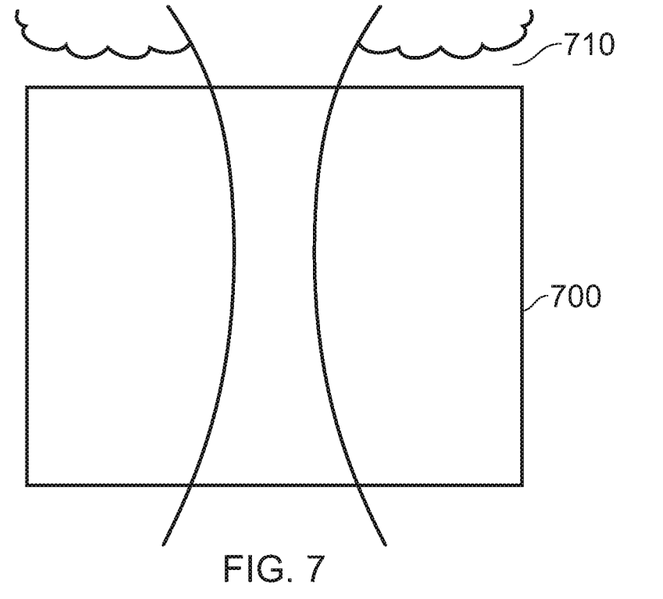
FIGS. 7-9 schematically illustrate a BVH traversal in accordance with a modified rasterization method.
Figure 8:
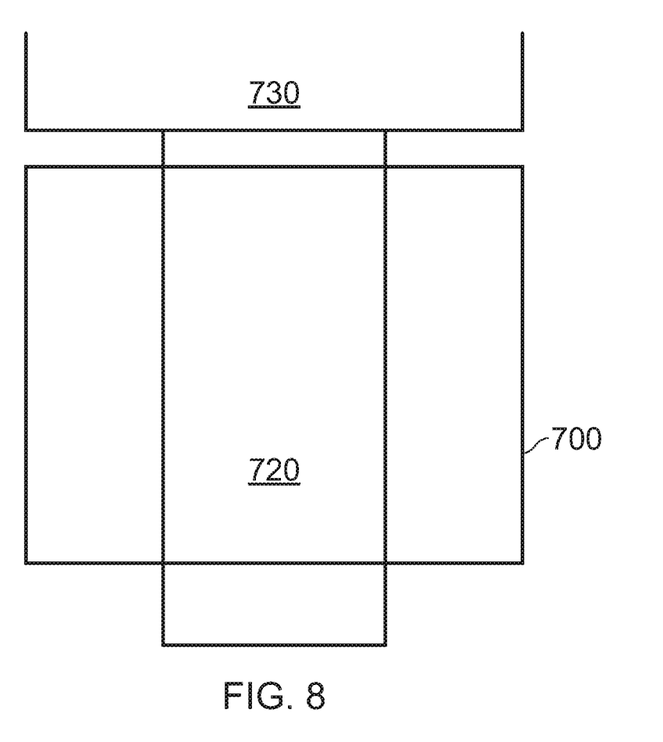
Figure 9:
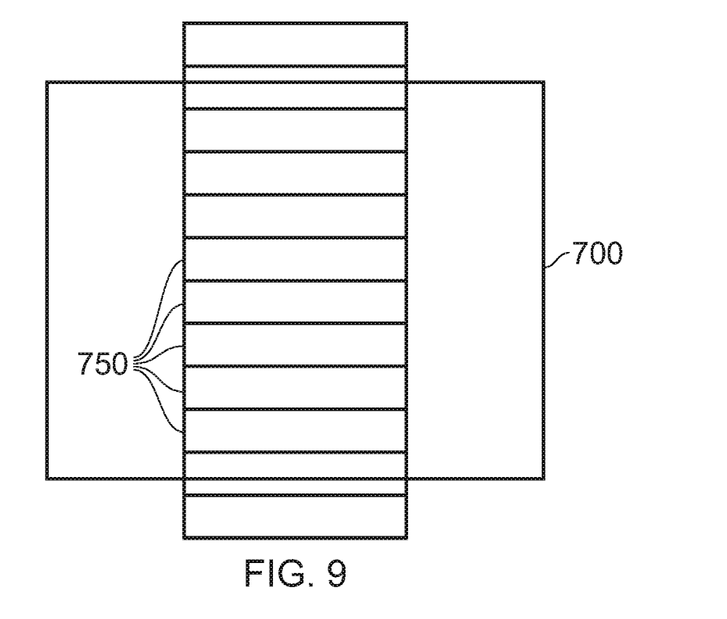

FIGS. 7-9 schematically illustrate an example of such a method being applied. The example discussed with reference to FIGS. 7-9 relates to a two-dimensional equivalent of the general three-dimensional method for the sake of clarity, and it should be considered clear as to how the process is to be adapted so as to apply to three dimensional examples. For instance, rather than a two-dimensional determination of an intersection a three-dimensional (so as to consider depth) may be used.

FIG. 7 schematically illustrates a display area 700 and an object (in this case, a tree) 710; the display area 700 is considered to be a two-dimensional representation of the frustum discussed above. It is clear from FIG. 7 that the trunk of the tree 710 is present within the display area 700, while the branches and leaves are above (and therefore outside) of the display area 700. It is therefore considered that it is not necessary to rasterize the triangles representing the branches and leaves of the tree 710.

In FIG. 8, the object 710 is represented by a pair of high-level BVH nodes 720 and 730 shown with the display area 700. An intersection determination process is performed at this stage to identify that the BVH node 730 is not intersected by the display area 700, while the BVH node 720 is intersected by the display area 700. Of course, in the present example, 'intersected' means that the display area overlaps the position of the BVH node 720 rather than there being an actual intersection as there would be in the three-dimensional equivalent in which a frustum with a three-dimensional shape is considered.

In response to such a determination, the BVH node 730 is discarded, while the BVH node 720 is traversed for further processing. In particular, child (or sub-) nodes of the BVH node 720 are identified and a further intersection determination process is performed.

FIG. 9 schematically illustrates such a process. In this Figure, sub-nodes 750 of the BVH node 720 are shown with the display area 700. The sub-nodes 750 are each subjected to an intersection determination process to determine whether they fall within the display area 700; in this case, it is apparent that the BVH nodes 750 at each end of the trunk are outside of the display area 700 and therefore can be discarded.

From here, the process may be continued until leaf nodes of the BVH are reached (leaf nodes being those nodes which contain primitive information). The result of such a process is a set of primitives (such as triangles) that describe the scene within the display area, which can be used to render an image.

Alternatively, information about the bounding volumes representing each node may be used to render the image. This may be suitable in areas of an image which are relatively low-detail (such as shadows). In such a process, a representative colour may be assigned to the bounding volume that is indicative of the colour of the elements contained within that node—for example, an average colour of the primitives contained within one or more leaf nodes that are within the bounding volume. Any suitable representation of a node may be utilised as appropriate, rather than being limited to such examples.

Further processing may also be performed as a part of this rasterization process so as to obtain a suitable set of information for generating an image for display; although these may not necessarily be useful in a two-dimensional example as discussed above.

For example, the obtained nodes (or primitives) may be subjected to a painter's algorithm using spatial information associated with the obtained nodes/primitives. In implementing the painter's algorithm, the spatial information is used to determine which elements (nodes or primitives) are furthest away from the viewpoint and these are projected to the two-dimensional plane first. The remaining elements are then projected to the plane in depth order from furthest to nearest.

Of course, any suitable method for determining which elements are to be visible within the final generated image may be used.

In some embodiments, one or more modifications may be provided that are considered to improve the rasterization process. Two examples of such modifications are discussed below; these may be each implemented individually or in combination as appropriate in a given embodiment.

A first modification is that of the use of a Gaussian splat to replace one or more elements of a BVH as appropriate. In particular, this modification causes the rasterization process to be cut short when the BVH nodes or primitives become too small relative to the pixel size used for the image to be displayed. This may occur when the node or primitive being considered are smaller than the pixel size, such that a single pixel corresponds to multiple elements, or when the respective sizes are within a threshold difference (such as an element being one and a half or two times the size of the pixels, for instance).

In such embodiments, a Gaussian splat is used to represent the information contained in the elements that correspond to the given pixel. A Gaussian splat is a simplified representation of a volume in which a value is assigned to a single point (such as the location of the centre of an element) and a radial Gaussian function is used to extend this value over an adjacent area with a varying weighting. Intermediate points may therefore have a value that is described by the weighted sum of adjacent Gaussian splats. It should be appreciated that alternative splats could also be used, rather than being limited only to Gaussian splats; in general terms, the splat is referred to as an 'imposter' that is used to represent a BVH node.

This may therefore simplify the rasterization process, in addition to reducing the number of intersection determination processes that are to be performed.

An alternative or additional modification is that of the use of geometry clusters in the rasterization process. This modification comprises the preparation of a drawlist of all triangles contained within the leaf nodes associated with a BVH node; this may be used when it is identified that the whole of a BVH node is within the frustum, for example, and therefore each of the triangles within the corresponding leaf nodes must also be within the frustum. This enables the triangles to be identified without the performing of successive intersection determination processes for each intermediate node, thereby accelerating the rasterization process. A further advantage associated with this modification is that of being able to recover index reuse information that is generally lost during the creation of the BVH by using the drawlist.

An example of representative code modified in view of both of these modifications may take the following form, for example. Of course, as noted above, these modifications may be implemented alone or in combination (or even not at all).

device, such as a local hard drive, from a removable storage medium, such as a disc, or from a remote storage device such as a server.

Reference here to obtaining a BVH may include obtaining a single BVH that represents a whole virtual scene, a single BVH that represents a portion of a virtual scene, or multiple BVHs that together represent at least a portion of a virtual scene. It is apparent that the BVH or BVHs that are obtained may therefore comprise any suitable amount of information so as to enable the rasterization process to be performed effectively.

In some embodiments, one or more BVH nodes are associated with a respective list identifying each of the primitives in the leaf nodes associated with those BVH nodes. This may be provided for any of the BVH nodes as appropriate; it should not be necessarily limited to only those nodes which are closest to the leaf nodes. In the context of FIG. 1, any or each of the nodes 110 and 120 may be associated with such a list detailing the primitives found in nodes 130 or 140 (as appropriate), and similarly those nodes 130 with sub-nodes 140 may also be associated with such a list.

Figure 10:
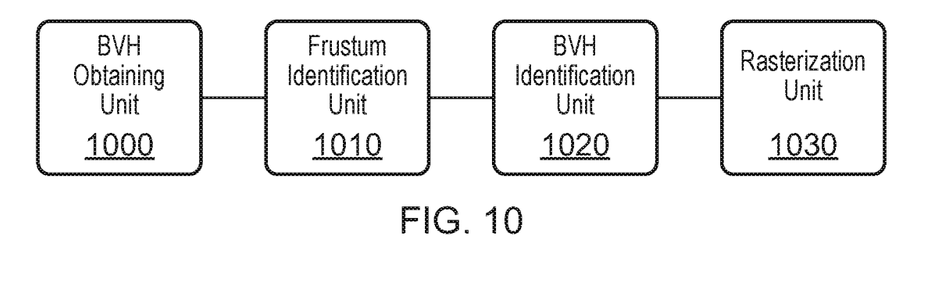
FIG. 10 schematically illustrates a rasterization system.

The frustum identification unit 1010 is operable to identify a viewing frustum associated with a virtual camera defining a viewpoint within the virtual environment. In some embodiments, a pose of the virtual camera is determined in dependence on a user input; for example a user may control an avatar within a game so as to cause them to look in a particular direction, with the viewpoint of the avatar being used to define a virtual camera position and orientation. The frustum may be defined in any suitable manner; for example, a depth and size of each plane may be defined with the overall shape being inferred from these parameters, with the direction and position of the viewpoint being used to locate the frustum within the virtual environment.

The BVH identification unit 1020 is operable to identify a BVH node associated with at least one bounding volume that is intersected by the frustum. In general, it is considered that any intersection between the frustum and the bounding

```
Rasterise(BVHNode)
{
    If FrustumIntersect (BVHNode)
    {
        If(Leaf)
            {Draw Leaf Triangles}
        Else If BVHNode smaller than pixel metric
            {Draw Gaussian splat as imposter for BVHNode}
        Else If BVHNode is tagged as geometry cluster
            {Draw all triangles inside cluster via index list of leaf nodes underneath}
        Else
            {For Each Child Rasterise(BVHNode.child[i])}
    }
}
```

FIG. 10 schematically illustrates a system for rasterizing an image of a virtual environment; that is, a system that is operable to perform a process according to any of the embodiments discussed above. The system in FIG. 10 comprises a BVH obtaining unit 1000, a frustum identifying unit 1010, a BVH identification unit 1020, and a rasterization unit 1030.

The BVH obtaining unit 1000 is operable to obtain a BVH representing one or more objects in the virtual environment, wherein each node of the BVH is associated with geometry information for the one or more objects at least partially contained within a bounding volume represented by that node. The BVH may be obtained from a local storage volume is sufficient for an identification to be performed, while in other examples it may be determined that at least a threshold (such as eighty percent, or any other suitable value) amount of the bounding volume must be within with frustum.

The rasterization unit 1030 is operable to rasterize an image of the virtual environment using the geometry information associated with the identified BVH node. In some embodiments, the geometry information comprises one or more primitives that are used to describe one or more objects within a virtual scene. Alternatively, or in addition, the geometry information comprises information defining the size and/or shape of bounding volumes within the BVH.

In some embodiments, the geometry information comprises depth information, and the rasterization process comprises a depth-sorting algorithm that utilises such information to be able to identify occlusions between one or more bounding volumes or associated primitives within the frustum. An example of such a depth-sorting algorithm is that of the painter's algorithm, as discussed above.

As discussed above, in some embodiments the rasterization unit 1030 is operable to use an imposter to represent the identified BVH node. The particular example of a Gaussian splat as an imposter is described above, but any suitable splat (or alternative representation) may be considered appropriate.

In some embodiments, the BVH identification unit 1020 is operable to identify one or more bounding volumes associated with a sub-node of the identified BVH node that are intersected by the frustum, while the rasterization unit 1030 is operable to instead rasterize an image of the virtual environment using the geometry information associated with the identified BVH sub-nodes. This represents an iterative approach to the process, in that once a BVH node has been identified as being within the frustum a determination may be made to determine whether the associated sub-nodes also fall within the frustum. This may enable a greater amount of information to be discarded, as not every sub-node within a BVH node will also be present within the frustum.

In some examples, the BVH identification unit 1020 is operable to repeat the identification process until a predetermined level of detail is reached. This means that the BVH may be traversed, with intersection determination processing being performed, until one or more predetermined conditions are met regarding when to terminate the traversal. The predetermined level of detail may be different for different parts of the BVH, as discussed below, which may lead to an asymmetric traversal of the BVH; for example, the traversal may terminate with a relatively high-level node for one part of the BVH while it continues to the leaf nodes for another part.

The predetermined level of detail may be a predetermined multiple of the pixel size used in the rasterization process, such as half, one, one and a quarter, one and a half, or two times the size of the pixels (although of course, any suitable value may be selected as appropriate to achieve a desired visual effect or level of performance). In such a case, it is the size of the bounding volume associated with a BVH node that may be compared to the pixel size so as to determine whether the predetermined level of detail has been reached.

Alternatively, or in addition, the predetermined level of detail may be set in dependence upon an identification of the content represented by the one or more objects associated with a BVH node. For instance, a multiple of the pixel size or a particular level of a BVH or size of bounding volume may be defined as the threshold in dependence upon the object that is represented by a given BVH node. For instance, objects such as shadows may be rendered with a lower image quality, as can background objects, without significantly degrading the visual quality of the generated image as they are generally not objects of focus for a user.

This can therefore lead to levels of detail being defined different for different parts of the BVH, the frustum, or the final display area. Per-object definitions of a level of detail are discussed above, leading to a BVH or BVH node having a different desired or acceptable level of detail. Similarly, a desired or acceptable level of detail may be defined on a per-BVH or per-BVH node basis based one any suitable characteristic. For instance, a priority or importance may be defined for the object or group of objects contained within a BVH or BVH node.

In some examples, the final display area or the frustum may be associated with a saliency map or the like to identify the importance of different (two- or three-dimensional) regions. This may be determined based upon any suitable parameters; examples include likelihood of focus on the region by a user, gaze direction (predicted or actual) of a user, and/or depth as measured with respect to the virtual camera position.

The arrangement of FIG. 10 is an example of a processor (for example, a GPU and/or CPU located in a games console or any other computing device) that is operable to rasterize an image of a virtual environment, and in particular is operable to:

obtain a BVH representing one or more objects in the virtual environment, wherein each node of the BVH is associated with geometry information for the one or more objects at least partially contained within a bounding volume represented by that node;

identify a viewing frustum associated with a virtual camera defining a viewpoint within the virtual environment;

identify a BVH node associated with at least one bounding volume that is intersected by the frustum; and rasterize an image of the virtual environment using the geometry information associated with the identified BVH node.

Figure 11:
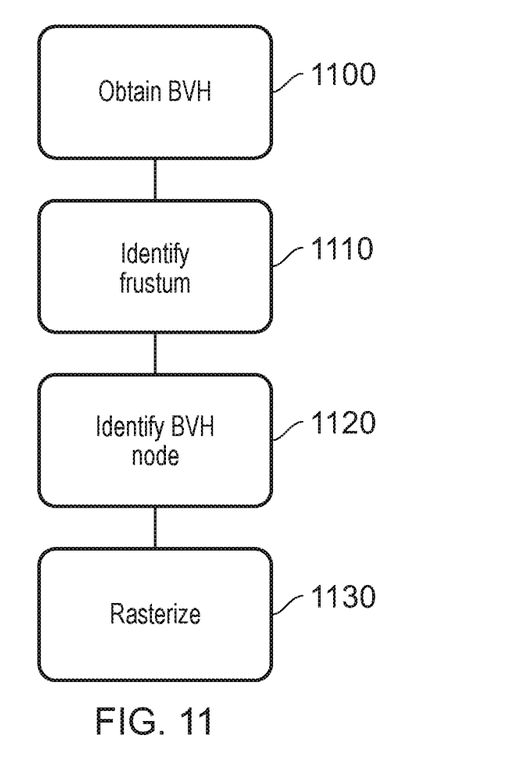
FIG. 11 schematically illustrates a rasterization method.

FIG. 11 schematically illustrates a method for rasterizing an image in accordance with the embodiments described above.

A step 1100 comprises obtaining a bounding volume hierarchy, BVH, representing one or more objects in the virtual environment, wherein each node of the BVH is associated with geometry information for the one or more objects at least partially contained within a bounding volume represented by that node.

A step 1110 comprises identifying a viewing frustum associated with a virtual camera defining a viewpoint within the virtual environment.

A step 1120 comprises identifying a BVH node associated with at least one bounding volume that is intersected by the frustum.

A step 1130 comprises rasterizing an image of the virtual environment using the geometry information associated with the identified BVH node.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be provided in accordance with one or more of the following numbered clauses:

1. A system for rasterizing an image of a virtual environment, the system comprising:
    a bounding volume hierarchy, BVH, obtaining unit operable to obtain a BVH representing one or more objects in the virtual environment, wherein each node of the BVH is associated with geometry information for the one or more objects at least partially contained within a bounding volume represented by that node;
    a frustum identification unit operable to identify a viewing frustum associated with a virtual camera defining a viewpoint within the virtual environment;
    a BVH identification unit operable to identify a BVH node associated with at least one bounding volume that is intersected by the frustum; and
    a rasterization unit operable to rasterize an image of the virtual environment using the geometry information associated with the identified BVH node.

2. The system of clause 1, wherein:
    the BVH identification unit is operable to identify one or more bounding volumes associated with a sub-node of the identified BVH node that are intersected by the frustum; and
    the rasterization unit is operable to instead rasterize an image of the virtual environment using the geometry information associated with the identified BVH sub-nodes.

3. The system of clause 2, wherein the BVH identification unit is operable to repeat the identification process until a predetermined level of detail is reached.

4. The system of clause 3, wherein the predetermined level of detail is a predetermined multiple of the pixel size used in the rasterization process.

5. The system of clause 3, wherein the predetermined level of detail is set in dependence upon an identification of the content represented by the one or more objects associated with a BVH node.

6. The system of any preceding clause, wherein the geometry information comprises one or more primitives.

7. The system of any preceding clause, wherein the geometry information comprises information defining the size and/or shape of bounding volumes within the BVH.

8. The system of any preceding clause, wherein the rasterization unit is operable to use an imposter to represent the identified BVH node.

9. The system of clause 8, wherein the imposter is a Gaussian splat.

10. The system of any preceding clause, wherein one or more BVH nodes are associated with a respective list identifying each of the primitives in the leaf nodes associated with those BVH nodes.

11. The system of any preceding clause, wherein the geometry information comprises depth information, and wherein the rasterization process comprises a depth-sorting algorithm.

12. The system of any preceding clause, wherein a pose of the virtual camera is determined in dependence on a user input.

13. A method for rasterizing an image of a virtual environment, the method comprising:
    obtaining a bounding volume hierarchy, BVH, representing one or more objects in the virtual environment, wherein each node of the BVH is associated with geometry information for the one or more objects at least partially contained within a bounding volume represented by that node;
    identifying a viewing frustum associated with a virtual camera defining a viewpoint within the virtual environment;
    identifying a BVH node associated with at least one bounding volume that is intersected by the frustum; and
    rasterizing an image of the virtual environment using the geometry information associated with the identified BVH node.

14. Computer software which, when executed by one or more computers, causes the one or more computers to perform the method of clause 13.

15. A non-transitory machine-readable storage medium which stores computer software according to clause 14.

The invention claimed is:

1. A system for rasterizing an image of a virtual environment, the system comprising:
    a bounding volume hierarchy, BVH, obtaining unit operable to obtain a BVH representing one or more objects in the virtual environment, wherein each node of the BVH is associated with geometry information for the one or more objects at least partially contained within a bounding volume represented by that node;
    a frustum identification unit operable to identify a viewing frustum associated with a virtual camera defining a viewpoint within the virtual environment;
    a BVH identification unit operable to identify a BVH node associated with at least one bounding volume that is intersected by the frustum; and
    a rasterization unit operable to rasterize an image of the virtual environment using the geometry information associated with the identified BVH node, wherein
    the BVH identification unit is operable to identify one or more bounding volumes associated with a sub-node of the identified BVH node that are intersected by the frustum;
    the rasterization unit is operable to instead rasterize an image of the virtual environment using the geometry information associated with the identified BVH sub-nodes,
    the BVH identification unit is operable to repeat the identification process until a predetermined level of detail is reached,
    the predetermined level of detail is set in dependence upon an identification of the content represented by the one or more objects associated with a BVH node, and
    the predetermined level of detail pertains to at least image quality of the content.

2. The system of claim 1, wherein one or more BVH nodes are associated with a respective list identifying each of the primitives in the leaf nodes associated with those BVH nodes.

3. The system of claim 1, wherein the predetermined level of detail includes a predetermined multiple of the pixel size used in the rasterization process.

4. The system of claim 1, wherein the geometry information comprises one or more primitives.

5. The system of claim 1, wherein the geometry information comprises information defining the size and/or shape of bounding volumes within the BVH.

6. The system of claim 1, wherein the rasterization unit is operable to use an imposter to represent the identified BVH node.

7. The system of claim 6, wherein the imposter is a Gaussian splat.

8. The system of claim 1, wherein the geometry information comprises depth information, and wherein the rasterization process comprises a depth-sorting algorithm that identifies occlusions between one or more bounding volumes, or associated primitives within the frustum, based on the depth information.

9. The system of claim 1, wherein a pose of the virtual camera is determined in dependence on a user input.

10. A method for rasterizing an image of a virtual environment, the method comprising:
   obtaining a bounding volume hierarchy, BVH, representing one or more objects in the virtual environment, wherein each node of the BVH is associated with geometry information for the one or more objects at least partially contained within a bounding volume represented by that node;
   identifying a viewing frustum associated with a virtual camera defining a viewpoint within the virtual environment;
   identifying a BVH node associated with at least one bounding volume that is intersected by the frustum; and
   rasterizing an image of the virtual environment using the geometry information associated with the identified BVH node, wherein:
   the identifying a BVH node includes identifying one or more bounding volumes associated with a sub-node of the identified BVH node that are intersected by the frustum;
   the rasterizing includes rasterizing an image of the virtual environment using the geometry information associated with the identified BVH sub-nodes,
   the identifying a BVH node includes repeating the identifying a predetermined level of detail is reached,
   the predetermined level of detail is set in dependence upon an identification of the content represented by the one or more objects associated with a BVH node, and the predetermined level of detail pertains to at least image quality of the content.

11. A non-transitory machine-readable storage medium which stores computer software which, when executed by a computer, causes the computer to perform a method for rasterizing an image of a virtual environment, the method comprising:
   obtaining a bounding volume hierarchy, BVH, representing one or more objects in the virtual environment, wherein each node of the BVH is associated with geometry information for the one or more objects at least partially contained within a bounding volume represented by that node;
   identifying a viewing frustum associated with a virtual camera defining a viewpoint within the virtual environment;
   identifying a BVH node associated with at least one bounding volume that is intersected by the frustum; and
   rasterizing an image of the virtual environment using the geometry information associated with the identified BVH node, wherein:
   the identifying a BVH node includes identifying one or more bounding volumes associated with a sub-node of the identified BVH node that are intersected by the frustum;
   the rasterizing includes rasterizing an image of the virtual environment using the geometry information associated with the identified BVH sub-nodes,
   the identifying a BVH node includes repeating the identifying a predetermined level of detail is reached, and
   the predetermined level of detail is set in dependence upon an identification of the content represented by the one or more objects associated with a BVH node, and
   the predetermined level of detail pertains to at least image quality of the content.

* * * * *